United States Patent [19]

Cunningham et al.

[11] Patent Number: 4,516,165
[45] Date of Patent: May 7, 1985

[54] ERROR RECOVERY PROCEDURE USING SELECTIVE ERASURE

[75] Inventors: Earl A. Cunningham; Dean C. Palmer, both of Rochester, Minn.

[73] Assignee: International Business Machines Corporation, Armonk, N.Y.

[21] Appl. No.: 453,386

[22] Filed: Dec. 27, 1982

[51] Int. Cl.³ ................. G11B 21/10; G11B 27/08
[52] U.S. Cl. ........................... 360/53; 360/13; 360/118
[58] Field of Search ................... 360/53, 118, 13; 371/10

[56] References Cited

U.S. PATENT DOCUMENTS 3,801,963  4/1974  Chen .................. 371/10 X
3,869,721  3/1975  Korda ................. 360/53 X

OTHER PUBLICATIONS

Barrett et al., Bidirectional Read-After-Write Tunnel Erase Head, IBM Technical Disclosure Bulletin, vol. 16, No. 12, May 1974.

Primary Examiner—Raymond F. Cardillo, Jr.
Assistant Examiner—Alan K. Aldous
Attorney, Agent, or Firm—Robert W. Lahtinen

[57] ABSTRACT

The data recovery procedure for errors caused by track occlusion as a result of adjacent track misregistration or head sensitivity to the low frequency content of adjacent tracks is effected by reading and storing the information from the adjacent tracks and thereafter erasing the adjacent tracks either on centerline or with the transducer offset toward the intermediate track of interest. The track of interest can then be read with the transducer aligned with the track centerline and at varying positions of offset. If this sequence of rereads fails, the erase step can be repeated with greater amounts of offset toward the intermediate track to further reduce inband interference and the reread sequence also repeated.

14 Claims, 2 Drawing Figures

ERROR RECOVERY PROCEDURE USING SELECTIVE ERASURE

BACKGROUND OF THE INVENTION

This invention pertains to read-write data storage devices having parallel or concentric tracks and more particularly to a method of recovering data from a track that has been obscured or overlapped by adjoining tracks.

As bit densities and track densities are increased, the possibilities of error are also increased. Memory or data storage failure will generally shut down an entire system. The ultimate failure is a non-recoverable loss of data and to avoid this occurrence, heroic efforts are made to overcome any possibility of having a hard error from which recovery cannot be made, including rereads, head shifts and error correction codes. The final effort is to send a disk drive to the factory for special data recovery procedures.

One source of error is the overlapping or occlusion of a track by the track misregistration (TMR) of one or both adjoining tracks. The most serious condition occurs when subsequent writing of both adjoining tracks have a TMR which causes partial erasure of the intervening track. This weakens the signal from the occluded, intervening track and injects in band interference from the adjacent tracks. This condition can exceed the ability of the "built-in" recovery procedures to successfully recapture the data or even the capability of factory recovery procedures and techniques.

Another source of error is low frequency inferference caused by the lateral read back sensitivity of the recording head. Generally of low amplitude, this interference can be significant if the data on the adjacent tracks has a low frequency content and is in phase so that the interference adds up. Just one phased track on either side of the track of interest can lead to problems. The interference from phased data can cause errors even when the track registration is perfect; no occlusion of the track is necessary. Although no signal reduction occurs in the track of interest, the lateral interference can be large enough to cause read back errors.

SUMMARY OF THE INVENTION

The invention is a technique for recovering data from a track which exhibits consistent errors for one of the following reasons: (1) the track has been occluded by adjoining tracks through writing over a portion of the track of interest due to track misregistration, or (2) the data on adjoining tracks is phased and of such a frequency that the lateral readback amplitudes are excessive. Since the error types have a slightly different recovery sequence, the recovery procedure can be optimized depending upon the sensitivity to the two error modes.

For optimum recovery of the occluded track errors (type 1), the following sequence would hold. First, the adjoining tracks are read, their data stored, and the tracks are erased. The track of interest is then read, which may now be possible through the elimination of the inband interference introduced by the adjoining tracks. If the data is now recoverable, all three tracks are rewritten on the correct track center lines.

If the initial read fails to recover the data on the track of interest, several retries are made using varying displacements of the read head from the track centerline. Should the data still not be recovered, the write heads can be offset from the adjacent track center lines toward the track of interest and the erase process repeated to recover the data after the inband interference from adjacent tracks has been further reduced.

To recover errors due to phased adjacent tracks (type 2), the sequence would be somewhat different; but the basic idea is the same. First, one of the adjoining tracks is read, its data stored, and the track is overwritten with either a DC erase or a high frequency pattern (highest possible data frequency). The track of interest is then read, which may be possible due to a reduction in the lateral interference from the adjoining track. If the data is now recoverable, both tracks are rewritten, probably at different locations in the file.

If successive reads fail to recover the data, the other adjoining track can be read, stored, and overwritten. If this does not allow recovery of the track of interest, the elimination of the adjoining tracks can be extended to the second, third, etc. adjoining tracks on each side of the track of interest until the lateral interference is sufficiently reduced to allow the central track to be recovered.

An optimum mixture of these two similar sequences can be adopted to handle the general error case where the error mode is unknown. This technique can be incorporated as an addition to the regular device recovery procedures with only a modest increase in hardware.

It is an object of the invention to provide a more effective method of recovering from otherwise hard errors which will enable the track density to be increased without degrading the performance. It is a further object of the invention to provide a data recovery method that may be used as a portion of the device recovery procedures to be utilized following use of other recovery procedures.

DETAILED DESCRIPTION

Figure 1:
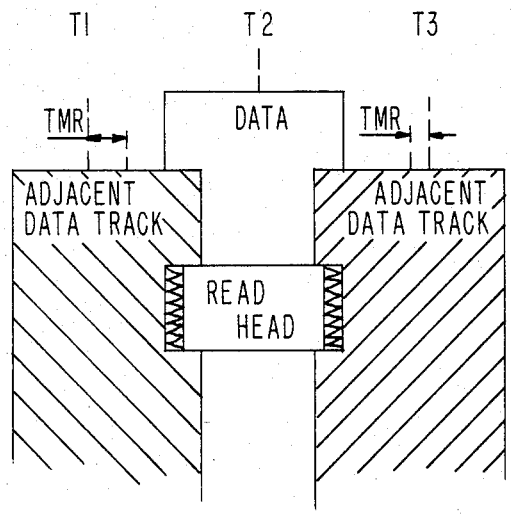
FIG. 1 is a schematic showing of three adjoining data tracks wherein the outer tracks have a track misregistration toward the intermediate track and a transducer head aligned with the intermediate track centerline.

FIG. 1 shows three adjacent tracks wherein the centerline of tract T2 is properly aligned, while the adjoining tracks, T1 and T3 are subject to track misregistration (TMR) causing each to overlap and partially erase track T2. The read head is schematically illustrated over the centerline of track T2 and shows the operative lateral extent including the read fringe.

Figure 2:
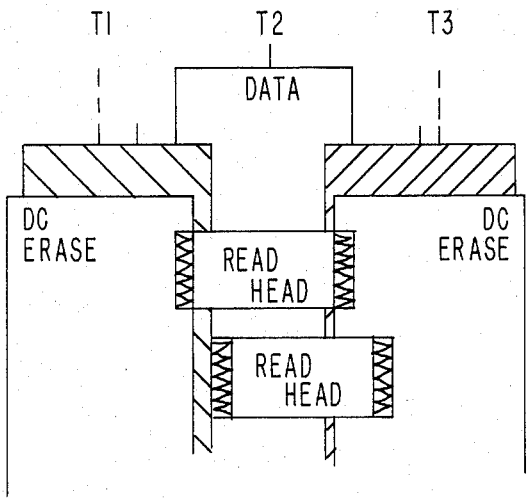
FIG. 2 is similar to FIG. 1 and shows in addition DC erase paths written in accordance with the recovery procedures described herein and further shows an alternate, shifted transducer head position.

FIG. 2 illustrates the T1, T2 and T3 track location of FIG. 1 and also shows the path of the DC erase of tracks T1 and T3 with an initial offset to at least partially remove the signals of such tracks and the accompanying injection of inband interference. The read head, shown centered on the centerline of track T2 now encounters a reduced interference signal. The shifted read head, as shown, now only encounters the narrow unerased portion of track T3 from which inband interference occurs.

In extreme situations, the track misregistration of a magnetic disk file is great enough to permit adjacent data tracks to overlap on one or both sides of a track to be read, as in FIG. 1. This will result in both the reduction of the data signal and the injection of inband interference from the adjacent track or tracks. This situation represents a loss of data and if sufficiently severe, cannot be remedied using the usual error recovery techniques such as rereads, head shifting and the use of error correcting codes. These hard errors are recovered, if at all, by returning the file to the factory where other special recovery procedures may be available.

The procedure hereafter described allows recovery of the TMR induced "hard error" without removing the file and as a part of the normal error recovery sequence. After the usual attempts at error recovery have been tried without success, the following procedure is invoked:

1. The data on the tracks adjacent to the occluded track are read and stored elsewhere either on a disk or in a buffer.
2. The read/write head is offset from the adjacent track centerline toward the occluded track and a DC erase is performed to establish the recorded data conditions illustrated in FIG. 2.
3. The head returns to the occluded track and a series of reads (and head shifts) are made. Reading is attempted with the head aligned with the track T2 centerline and with various offsets from the centerline.
4. After a successful read, all three tracks are rewritten with the correct centerline alignment.

If the procedure is not successful after a predetermined number of reads at various locations of transducer offset from track T2 centerline, the steps 2 and 3 are repeated with the offset of the transducer toward the occluded track increased during performance of the DC erase.

The procedure is effective because it is not the reduction in track width alone that causes the hard error, but the combination of a reduced data signal and the addition of inband interference from the adjacent track or tracks. The DC erase will eliminate enough interference to make recovery possible. The offset in the erased tracks can be optimized according to the track density and linear density of the file, but it does not have to be large to have an effect. A significant improvement in recovery has been demonstrated with an offset as small as 5% of the track pitch. Larger offsets produce even more improvement, but these gains must be balanced by the possibility of overlapping the unerased signal portion of the track of interest.

The recovery procedure may be modified in other embodiments used to practice the invention. Following the steps of reading and storing the data on the two tracks immediately adjoining the track of interest, these tracks may be initially erased by D.C. erasure along the centerline of such adjoining tracks. Using this modification it may be possible to recover the data from the track of interest without offsetting the head during erasure. If recovery is not effected during the ensuing read sequences, the erasure can be repeated using an offset toward the track of interest.

In a further embodiment the recovery procedure can be further partitioned be initially reading and storing the data from one immediately adjacent track and then erasing such one track along its centerline. If the read sequence associated with the track of interest fails to recover the data thereon, the adjacent track at the other side of the track of interest is read, the data stored and such track erased along its centerline. If the read sequence then fails to recover the data on the track of interest, the procedure is continued using erasure with progressive offsets with respect to both adjoining tracks or individually in a predetermined sequence.

The only hardware changes necessary to practice the recovery procedure is the ability to write a DC erase field (forbidden by many encoding schemes) and a head shift capability (which often already exists). In those systems incapable of a D.C. erase, the best alternative is to provide a comparable erase function by overwriting with a high frequency signal. This is fully effective with respect to low frequency phased interference, but has limited benefit with respect to occluded tracks resulting from track misregistration. With respect to occluded tracks a selected data pattern which minimizes interference to the data signal provides a partially effective erase signal.

In future hard files, the probability of hard errors can be expected to become more frequent as track and linear densities are continuously increased. The procedure described herein provides a means for reducing these errors significantly with little or no hardware cost increase. An alternative view is that the enhanced capability of recovering data or the avoidance of hard errors permits an increase in track density of approximately 10% without degrading performance.

While the invention has been particularly shown and described with reference to a preferred embodiment thereof, it will be understood by those skilled in the art that various changes in the form and details thereof may be made therein without departing from the spirit and scope of the invention.

What is claimed is:

1. In a high density hard disk media storage device having a transducer head which reads and writes data, the method of recovering data from the device having magnetically recorded information in a series of adjoining parallel tracks wherein track misregistration has partially obscured the information on a given track comprising:
    reading and storing the data from the tracks adjoining either side of said given track,
    respectively erasing both of said adjoining tracks with said transducer head while offsetting the transducer head toward said given track relative to said adjoining tracks, and
    aligning said transducer with said given track and conducting a read operation to recover data from said given track.

2. The method of claim 1 further comprising the rewriting of said given track and said adjoining tracks following recovery of data from said given track.

3. The data recovery method of claim 2 wherein the step of reading said given track following the erasing of said adjoining tracks with said transducer head includes a plurality of rereads using varying amounts of head offset from the centerline of said given track until a successful read of the data on said given track occurs or a predetermined sequence of re-read cycles has taken place.

4. The data recovery method of claim 3 wherein if the data on said given track is not recovered during said predetermined sequence of reread cycles, the method comprises the further steps of:
    erasing each of said adjoining tracks with said transducer head using an increased transducer offset in the direction of said given track relative to said adjoining tracks, and thereafter, reading said given track to recover the data thereon.

5. The data recovery method of claim 4 wherein said step of reading said given track which occurs after erasing said adjoining tracks with said transducer head and with increased transducer offsets includes a plurality of rereads using varying amounts of head offset from the centerline of said given track until a successful read of the data on said given track occurs or a predetermined sequence of reread cycles has taken place.

6. In a storage device having a transducer head which reads and writes data and rigid rotating magnetic storage media, the method of recovering data magnetically recorded on such media in a series of adjoining parallel tracks wherein track misregistration has partially obscured the information on a given track comprising:
    reading and storing the data from the tracks adjoining either side of said given track,
    respectively erasing both of said adjoining tracks with said transducer head while respectively aligning the transducer head with the centerline of such adjoining track, and
    thereafter aligning said transducer with said given track and conducting a read operation to recover data from said given track.

7. The method of claim 6 further comprising the rewriting of said given track and said adjoining tracks following recovery of data from said given track.

8. The data recovery method of claim 7 wherein the step of reading said given track following the erasing of said adjoining tracks with said transducer head includes a plurality of rereads using varying amounts of head offset from the centerline of said given track until a successful read of the data on said given track occurs or a predetermined sequence of re read cycles has taken place.

9. The data recovery method of claim 8 wherein if the data on said given track is not recovered during said predetermined sequence of reread cycles, the method comprises the further steps of:
    erasing each of said adjoining tracks with said transducer head using transducer offsets from such adjoining track ceterline in the direction of said given track, and thereafter
    reading said given track to recover the data thereon.

10. The data recovery method of claim 9 wherein said step of reading said given track which occurs after erasing said adjoining tracks with said transducer head and with transducer offsets includes a plurality of rereads using varying amounts of head offset from the centerline of said given track until a successful read of the data on said given track occurs or a predetermined sequence of reread cycles has taken place.

11. In a rotating storage device having rigid magnetic storage media and a transducer head which reads and writes data or parallel tracks, the method of recovering data magnetically recorded on such media in a series of adjoining parallel tracks wherein track misregistration has partially obscured the information on a given track comprising:
    reading the storing the data from a first track immediately adjoining said given track at one side thereof,
    erasing said first track with said transducer head and with the transducer head centerline aligned with the centerline of said first track, and
    aligning said transducer with said given track and conducting a read operation to recover data from said given track.

12. The data recovery method of claim 11 wherein if the data on said given track is not recovered during said predetermined sequence of reread cycles, the method comprises the further steps of:
    reading and storing the data from a second track immediately adjoining said given track at the side opposite said one side, erasing said second track with said transducers head and with the transducer head centerline aligned with the centerline of said second track, and thereafter,
    reading said given track to recover the data thereon 13. The method of claim 11 further comprising the rewriting of said given track and said first track following recovery of data from said given track.

14. The data recovery method of claim 13 wherein the step of reading said given track following the erasing of said adjoining track by said transducer head includes a plurality of rereads using varying amounts of head offset from the centerline of said given track until a successful read of the data on said given track occurs or a predetermined sequence of re read cycles has taken place.

* * * * *